(12) United States Patent
Wakabayashi

(10) Patent No.: US 8,089,403 B2
(45) Date of Patent: Jan. 3, 2012

(54) MOBILE TERMINAL

(75) Inventor: Naoyuki Wakabayashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 218 days.

(21) Appl. No.: 12/552,689

(22) Filed: Sep. 2, 2009

(65) Prior Publication Data

US 2010/0085255 A1 Apr. 8, 2010

(30) Foreign Application Priority Data

Oct. 3, 2008 (JP) ................................ 2008-257949

(51) Int. Cl.
*G01S 19/36* (2010.01)
*H01Q 3/00* (2006.01)

(52) U.S. Cl. .................... 342/357.76; 342/359

(58) Field of Classification Search .................. 342/359, 342/419, 357.63, 357.71, 357.76; 343/754, 343/757

See application file for complete search history.

(56) References Cited

FOREIGN PATENT DOCUMENTS

| EP | 1 732 232 A1 | 12/2006 |
|---|---|---|
| EP | 1 885 102 A1 | 2/2008 |
| JP | 61-200702 A | 9/1986 |
| JP | 3-280625 A | 12/1991 |
| JP | 2003-134214 A | 5/2003 |
| JP | 2006-19925 A | 1/2006 |
| JP | 2006-145314 A | 6/2006 |
| JP | 2007-166533 A | 6/2007 |

OTHER PUBLICATIONS

European Search Report dated Dec. 28, 2009 (six (6) pages).

*Primary Examiner* — Dao Phan
(74) *Attorney, Agent, or Firm* — Crowell & Moring LLP

(57) ABSTRACT

A mobile communication terminal includes a terminal body portion, a display portion mounted on the terminal body portion to be rotatable to a first display position and a second display position while being substantially parallel to a surface of the terminal body portion and a single satellite radio receiving antenna provided on the display portion to be integrally rotatable with the display portion and formed to be located on a first rotational position when the display portion is located on the first display position and to be located on a second rotational position when the display portion is located on the second display position, wherein a direction of directivity of the satellite radio receiving antenna is set to a direction inclined upward with respect to a display surface of the display portion by a prescribed angle.

20 Claims, 7 Drawing Sheets

MOBILE TERMINAL

BACKGROUND OF THE INVENTION

1. Field of the Invention

The present invention relates to a mobile terminal, and more particularly, it relates to a mobile terminal comprising an antenna.

2. Description of the Background Art

A mobile terminal comprising an antenna is known in general, as disclosed in each of Japanese Patent Laying-Open Nos. 2007-166533, 2006-145314, 61-200702 (1986) and 3-280625 (1991), for example.

The aforementioned Japanese Patent Laying-Open No. 2007-166533 discloses a folding portable radio apparatus (mobile terminal) comprising a plate-like upper housing provided with a display portion, a plate-like lower housing provided with operating buttons and the like, an intermediate housing provided between the upper housing and the lower housing and a patch antenna for receiving a GPS (global positioning system) having a circularly polarized wave characteristic, provided in the intermediate housing. The upper housing is rotatable (turnable) in a horizontal plane with respect to the lower housing through the intermediate housing, so that the folding portable radio apparatus can be used by vertically and horizontally changing the display portion of the upper housing without changing the direction of the lower housing. The patch antenna provided on the intermediate housing is formed to have directivity in a zenith direction (GPS satellite side) when the lower housing is placed on the horizontal plane. Thus, in the folding portable radio apparatus described in the aforementioned Japanese Patent Laying-Open No. 2007-166533, the patch antenna is provided on the intermediate housing turnable in the horizontal plane with the upper housing, so that directivity can be directed in the zenith direction without changing the direction of the directivity due to rotation of the intermediate housing (patch antenna) also when the upper housing is rotated in a state where the lower housing is arranged on the horizontal plane and the display portion vertically and horizontally changes in the horizontal plane.

The aforementioned Japanese Patent Laying-Open No. 2006-145314 discloses a positioning device (mobile terminal) comprising upper and lower housings, a satellite radio receiving antenna of a linearly-polarized wave (horizontally-polarized wave) and a communication antenna of a linearly-polarized wave (vertically-polarized wave), wherein the plane of polarization of the satellite radio receiving antenna and the plane of polarization of the communication antenna (the vertically-polarized wave and the horizontally-polarized wave) are orthogonal to each other. This satellite radio receiving antenna has directivity extending in a vertical direction, and a radio wave from an extensional axial direction of the antenna orthogonal to the vertical direction is unlikely to be received. The planes of polarization of the satellite radio receiving antenna and the communication antenna are orthogonal to each other, and hence the satellite radio receiving antenna is inhibited from receiving the radio wave transmitted/received from the communication antenna.

The aforementioned Japanese Patent Laying-Open No. 61-200702 discloses an antenna switching portable radio (mobile terminal) comprising a housing, a first inverted F antenna and a second inverted F antenna provided on both side surfaces of the housing opposed to each other respectively, a detector detecting inclination of the housing, a high-frequency signal switch switching connection from one of the first and second inverted F antennas to the other of the first and second inverted F antennas and a receiver and a transmitter provided on a side surface (front surface) in a direction orthogonal to the side surfaces provided with the first and second inverted F antennas. The portable radio (housing) is largely inclined when calling in a state where a user puts his ear against the receiver and moves the transmitter to his mouth. Thus, this antenna switching portable radio is so formed that a detecting portion detects the inclination of the antenna switching portable radio, and the high-frequency signal switch transmits/receives a radio wave on the basis of output from the detecting portion by connection to the inverted F antenna located on an upper side (in the vertical direction) among the first and second inverted F antennas provided on the both side surfaces of the housing.

The aforementioned Japanese Patent Laying-Open No. 3-280625 discloses a portable wireless communication device (mobile terminal) comprising a housing, a plurality of antennas, a selection portion for performing antenna diversity communication selecting an antenna having good receiver sensitivity from the plurality of antennas and switching to the same and a receiving portion connected to the respective antennas. This portable wireless communication device is so formed that correlation between radiation characteristics of the plurality of antennas is reduced by connecting the plurality of antennas to a circuit substrate or ground pattern separately provided.

In the aforementioned folding portable radio apparatus described in Japanese Patent Laying-Open No. 2007-166533, however, the patch antenna provided on the intermediate housing is formed to have directivity in the zenith direction in the state where the lower housing is placed on the horizontal plane, while the user must operate while watching the display portion when using the display function (GPS function) of the positional information by the GPS. Thus, when the user grasps the lower housing and uses in a state of holding while inclining the display portion at an easily visible angle, the directivity of the patch antenna is directed not to the zenith direction (GPS satellite side) but to a direction of the user and hence the directivity of the patch antenna is disadvantageously directed in the zenith direction when the user grasps and uses the apparatus.

In the aforementioned positioning device described in Japanese Patent Laying-Open No. 2006-145314, the satellite radio receiving antenna has directivity extending in the vertical direction (direction of gravitational force), and the radio wave from the extensional axial direction of the antenna orthogonal to the direction of gravitational force is unlikely to be received, and hence when the housing is rotated and the direction of the device itself is horizontally inclined, the directivity of the satellite radio receiving antenna is horizontally inclined and a satellite radio wave enters from the extensional axial direction of the satellite radio receiving antenna, and the satellite radio wave is disadvantageously unlikely to be received. Thus, when the direction of the positioning device is changed to be used, the directivity of the satellite radio receiving antenna can not be disadvantageously directed in the zenith direction.

In the aforementioned antenna switching portable radio described in Japanese Patent Laying-Open No. 61-200702, the plurality of antennas, the detector of inclination and the high-frequency signal switch must be provided in order to suppress reduction of the receiver sensitivity due to change of an attitude of the device, and hence the number of components is disadvantageously increased.

In the aforementioned portable wireless communication device described in Japanese Patent Laying-Open No. 3-280625, the plurality of antennas, the circuit substrate or ground pattern connected to the plurality of antennas and separately provided and the dedicated selection portion must be provided in order to perform antenna diversity communication selecting the antenna having good receiver sensitivity from the plurality of antennas and switching to the same, and hence the number of components is disadvantageously increased.

SUMMARY OF THE INVENTION

The present invention has been proposed in order to solve the aforementioned problem, and an object of the present invention is to provide a mobile terminal capable of directing directivity of a satellite radio receiving antenna in a zenith direction while suppressing increase of the number of components, also when the direction of the mobile terminal is changed by a user in a state where the user grasps to incline a terminal body portion.

A mobile terminal according to an aspect of the present invention comprises a terminal body portion, a display portion mounted on the terminal body portion to be rotatable to a first display position and a second display position while being substantially parallel to a surface of the terminal body portion and a single satellite radio receiving antenna having unidirectionality upward, provided on the display portion to integrally rotate with the display portion, and formed to be located on a first rotational position when the display portion is located on the first display position and to be located on a second rotational position different from the first rotational position when the display portion is located on the second display position, wherein a direction of directivity of the single satellite radio receiving antenna is so set to a direction inclined upward with respect to a display surface of the display portion by a prescribed angle that the direction of the directivity of the satellite radio receiving antenna is directed to a zenith direction in both of a case where the satellite radio receiving antenna is located on the first rotational position and a case where the satellite radio receiving antenna is located on the second rotational position when the terminal body portion and the display surface of the display portion is held by a user so as to be inclined obliquely with respect to a horizontal plane in a state where an upper direction of display of the display portion is an upper direction of the terminal body portion in use of the terminal body portion.

In the mobile terminal according to this aspect, as hereinabove described, the single satellite radio receiving antenna provided on the display portion to integrally rotate with the display portion and having unidirectionality upward is so set that the direction of the directivity of the single satellite radio receiving antenna is the direction inclined upward with respect to the display surface of the display portion by the prescribed angle to be directed in the zenith direction in both of the case where the satellite radio receiving antenna is located on the first rotational position and the case where the satellite radio receiving antenna is located on the second rotational position, when the user holds to incline the terminal body portion and the display surface of the display portion obliquely with respect to the horizontal plane in a state where the upper direction of the display direction of the display portion is the upper direction of the terminal body portion in use of the terminal body portion. According to this structure, the directivity of the satellite radio receiving antenna is directed in the zenith direction on both of the first rotational position and the second rotational position following the rotation of the display portion, when the user rotates the display portion and the upper direction of the display direction of the image displayed on the display portion is the upper direction of the terminal body portion in view of visibility and the terminal body portion is held in a state where the display surface is inclined with respect to the horizontal plane. Thus, the directivity of the satellite radio receiving antenna can be directed in the zenith direction also when the user grasps the mobile terminal and changes the direction of the mobile terminal in a vertical manner and in a horizontal manner for use. When the user uses the mobile terminal while watching the display portion, the mobile terminal is so held that the display of the display portion is always upward. Thus, the terminal body portion is provided with the display portion mounted to be rotatable to the first display position and the second display position while being substantially parallel to the surface of the terminal body portion and the single satellite radio receiving antenna provided on the display portion to be rotate integrally with the display portion, whereby it is possible that the position of the satellite radio receiving antenna with respect to the display direction of the display portion is not changed even when the display portion is rotated in a case where the user changes the direction of the mobile terminal in the vertical manner, the horizontal manner and the like for use. Thus, a plurality of antennas and a switching portion of the antennas may not be provided separately in order to correspond to each of the cases of the vertical manner and the horizontal manner also when the user changes the direction of the mobile terminal, and hence increase of the number of components can be suppressed.

In the aforementioned mobile terminal according to the aspect, the prescribed angle of the satellite radio receiving antenna with respect to the display surface of the display portion is preferably an angle of at least 30 degrees and not more than 60 degrees. According to this structure, the terminal body portion is generally held while inclining the display portion by an angle of about 45 degrees with respect to the horizontal direction so that the user easily watches the display portion, when the user grasps the terminal body portion and uses the GPS function, and hence the direction of the directivity of the satellite radio receiving antenna has the angle of at least 30 degrees and not more than 60 degrees with respect to the display surface of the display portion inclined by 45 degrees from the horizontal direction in the state of grasping the terminal body portion, and the direction of the directivity of the satellite radio receiving antenna can be substantially 90 degrees (zenith direction) with respect to the horizontal direction. Thus, the directivity of the satellite radio receiving antenna having unidirectionality upward can be directed in the zenith direction in the state of grasping the terminal body portion 1 for use.

In this case, the prescribed angle is preferably substantially 45 degrees. According to this structure, the direction of the directivity of the satellite radio receiving antenna can be substantially 90 degrees (zenith direction) with respect to the horizontal direction in a state where the display portion is so inclined by the angle of about 45 degrees with respect to the horizontal direction that the user grasps the terminal body portion and easily watches the display portion. Thus, receiver sensitivity of the satellite radio receiving antenna can be brought into the best condition in the state where the display portion is so inclined by the angle of about 45 degrees with respect to the horizontal direction so that the user easily watches the display portion.

In the aforementioned mobile terminal according to the aspect, the display portion is preferably provided rotatably by at least 90 degrees, and the satellite radio receiving antenna provided on the display portion is preferably arranged at a position on a side of the upper direction of the display of the display portion. When using the GPS function or the like operated while watching the display portion, the user often uses the mobile terminal while holding the terminal body portion in the vertical manner or the horizontal manner, and the terminal body portion is always held so that the display direction of the display portion is the upper direction for viewing the display portion regardless of the direction of the mobile terminal. According to the aforementioned structure, the mobile terminal can be easily used in the vertical manner and the horizontal manner by rotating the display portion by at least 90 degrees and the satellite radio receiving antenna can be arranged on the upper direction side of the display portion in use regardless of the direction of the mobile terminal. Thus, the satellite radio wave is not blocked by the terminal body portion, the display portion or the like, dissimilarly to a case where the satellite radio receiving antenna is arranged on a lower side of the display portion or the terminal body portion due to the direction of the mobile terminal, and hence excellent receiver sensitivity can be maintained regardless of the direction of the mobile terminal.

In this case, the satellite radio receiving antenna is preferably arranged in the vicinity of a central portion of the display of the display portion in a horizontal direction. According to this structure, the satellite radio receiving antenna can be arranged on a position where a satellite radio wave is unlikely to be blocked by a user's finger or the like dissimilarly to a case where the satellite radio receiving antenna is arranged in the vicinity of the end of the display of the display portion in the horizontal direction.

In the aforementioned mobile terminal according to the aspect, the display portion preferably includes a display screen portion and a frame body arranged to enclose the display screen portion, and the satellite radio receiving antenna is preferably provided on the frame body of the display portion separated by a prescribed distance from a rotation center of the display portion with respect to the terminal body portion. According to this structure, the display by the display screen portion of the display portion is not blocked even when the satellite radio receiving antenna is provided on the display portion.

In this case, the satellite radio receiving antenna is preferably arranged on a position in the vicinity of an end surface of the frame body on a side of the upper direction of the display of the display portion. According to this structure, the satellite radio receiving antenna can be arranged on the most upper side of the terminal body portion in the frame body of the display portion. Thus, excellent receiver sensitivity of the satellite radio receiving antenna can be more easily maintained without blocking a satellite radio wave by other portion of the mobile terminal.

In the aforementioned structure in which the satellite radio receiving antenna is arranged on the position in the vicinity of the end surface of the frame body, the satellite radio receiving antenna is preferably arranged in the frame body of the display portion. According to this structure, the satellite radio receiving antenna is not exposed on the outside of the frame body, and hence an impact can be inhibited from externally applying to the satellite radio receiving antenna where the direction of the directivity is set to the direction inclined by the prescribed angle with respect to the display surface of the display portion.

In the aforementioned structure in which the satellite radio receiving antenna is arranged in the frame body, the satellite radio receiving antenna is preferably so fixedly arranged in the frame body of the display portion that the direction of the directivity is inclined upward with respect to the display surface of the display portion by the prescribed angle. According to this structure, the satellite radio receiving antenna can be easily so arranged that the direction of the directivity of the satellite radio receiving antenna is inclined upward with respect to the display surface of the display portion by the prescribed angle by simply fixedly mounting the satellite radio receiving antenna in the frame body while inclining the satellite radio receiving antenna by the prescribed angle.

In the aforementioned mobile terminal according to the aspect, a display direction of an image displayed on the display portion is preferably fixed with respect to the display portion, and the display direction of the image displayed on the display portion is rotated with respect to the terminal body portion by the rotational amount of the display portion when the display portion is rotated between the first display position and the second display position, and the direction of the directivity of the satellite radio receiving antenna with respect to the display direction of the image displayed on the display portion is preferably not changed also when the display portion is rotated to the first display position and the second display position with respect to the terminal body portion. According to this structure, the direction of the directivity of the satellite radio receiving antenna with respect to the display direction of the image displayed on the display portion is not changed also when the display portion is rotated between the first display position and the second display position and the direction of the mobile terminal is so changed that the upper direction of the image displayed on the display portion is upward, and hence change (rotation) of the display direction of the image displayed on the display portion may not be controlled corresponding to the rotational position of the display portion and the control of the mobile terminal can be simplified. The display direction of the image and the direction of the directivity of the satellite radio receiving antenna can correspond to each other without employing a dedicated sensor dissimilarly to a case where a sensor for detecting the direction of the mobile terminal must be provided when changing the display direction of the image following the change of the direction of the display portion or the terminal body portion.

In the aforementioned mobile terminal according to the aspect, the terminal body portion preferably has a rectangular shape in plan view, and is preferably so formed that a vertical direction of the display of the display portion is a longitudinal direction of the terminal body portion when the display portion is located on the first display position and 5 the satellite radio receiving antenna is located on the first rotational position while the vertical direction of the display of the display portion is a short-side direction of the terminal body portion when the display portion is located on the second display position and the satellite radio receiving antenna is located on the second rotational position. According to this structure, the satellite radio receiving antenna is located on the first rotational position when the longitudinal direction of the rectangular terminal body portion is directed in the vertical direction to use the mobile terminal in the vertical manner, and the satellite radio receiving antenna is located on the second rotational position when the longitudinal direction of the rectangular terminal body portion is directed in the horizontal direction to use the mobile terminal in the horizontal manner. Thus, the mobile terminal can be used in the state where the directivity of the satellite radio receiving antenna is always directed in the zenith direction also when the mobile terminal is used in the vertical manner (the longitudinal direction is the vertical direction of the display) or in the horizontal manner (the short-side direction is the vertical direction of the display).

In this case, the satellite radio receiving antenna provided on the display portion is preferably arranged on a position on a side of the upper direction of the display of the display portion, and the satellite radio receiving antenna is arranged on a position in the vicinity of an outline of the rectangular terminal body portion in plan view when the satellite radio receiving antenna is located on the second rotational position with respect to the terminal body portion. According to this structure, the satellite radio receiving antenna can be arranged on the position in the vicinity of the outline on the upper side (the upper direction side of the display of the display portion) of the terminal body portion also when the rectangular mobile terminal (terminal body portion) is used in the horizontal manner (the short-side direction is the vertical direction of the display). Thus, the satellite radio receiving antenna can be arranged on the position where a satellite radio wave is unlikely to be blocked by the display portion also when the rectangular mobile terminal (terminal body portion) is used in the horizontal manner (the short-side direction is the vertical direction of the display).

In the aforementioned case where the display portion is located on the first display position, the vertical direction of the display of the display portion is the longitudinal direction of the terminal body portion and the vertical direction of the display of the display portion is the short-side direction of the terminal body portion when the display portion is located on the second display position, the display portion is preferably provided to partially overlap with an upper surface of the rectangular terminal body portion in plan view, and the satellite radio receiving antenna is preferably located inside the outline of the rectangular terminal body portion in plan view when the display portion is so rotated to the first display position or the second display position that the satellite radio receiving antenna is located on the first rotational position or the second rotational position with respect to the terminal body portion. According to this structure, the display portion does not protrude from an outer periphery of the rectangular terminal body portion in plan view in both of the case where the satellite radio receiving antenna is located on the first rotational position with respect to the terminal body portion and the case where the satellite radio receiving antenna is located on the second rotational position with respect to the terminal body portion, and hence the mobile terminal can be used without loosing easy holding and operability even when the direction of the mobile terminal is changed, dissimilarly to a case where the terminal body portion and the display portion are arranged to have an L-shape by rotating the display portion, for example.

In this case, the satellite radio receiving antenna provided on the display portion is preferably provided to be located inside the outline of the rectangular terminal body portion in plan view in both of a case where the satellite radio receiving antenna is located on the first rotational position with respect to the terminal body portion and a case where the satellite radio receiving antenna is located on the second rotational position with respect to the terminal body portion. According to this structure, the satellite radio receiving antenna does not protrude to the outside of the rectangular terminal body portion in plan view in both of the case where the satellite radio receiving antenna is located on the first rotational position with respect to the terminal body portion and the case where the satellite radio receiving antenna is located on the second rotational position with respect to the terminal body portion, and hence an impact can be inhibited from externally applying to the satellite radio receiving antenna.

In the aforementioned structure in which the satellite radio receiving antenna is located inside the outline of the rectangular terminal body portion in plan view, the display portion preferably has a rectangular shape in plan view, and a long side of the display portion is arranged inside beyond the outline of the rectangular terminal body portion in plan view when the display portion is rotated to the second display position with respect to the terminal body portion, and the satellite radio receiving antenna is preferably arranged inside of the terminal body portion beyond the long side of the display portion in plan view when the satellite radio receiving antenna is arranged on the second rotational position by rotating the display portion to the second display position. According to this structure, the satellite radio receiving antenna is arranged not only inside beyond the outline of the terminal body portion but also inside of the terminal body portion beyond the long side of the display portion, and hence an impact can be inhibited from externally applying to the satellite radio receiving antenna.

In the aforementioned mobile terminal according to the aspect, the terminal body portion preferably includes an upper surface portion and a recess portion provided on a part of the upper surface portion, the display portion is preferably mounted on the recess portion of the terminal body portion, and the satellite radio receiving antenna is preferably arranged on a height position between the upper surface portion of the terminal body portion and a bottom surface of the recess portion. According to this structure, the satellite radio receiving antenna does not protrude in the height direction (thickness direction) of the terminal body portion. Thus, an impact can be inhibited from externally applying to the satellite radio receiving antenna so arranged that the direction of the directivity is inclined by the prescribed angle.

In the aforementioned mobile terminal according to the aspect, a speaker is preferably provided on a first end of the terminal body portion in a longitudinal direction, and the satellite radio receiving antenna is preferably arranged on a position on a side of the speaker beyond a central position of the terminal body portion in the longitudinal direction when the display portion is so rotated to the first display position or the second display position that the satellite radio receiving antenna is located on the first rotational position or the second rotational position with respect to the terminal body portion. According to this structure, the satellite radio receiving antenna can be arranged on the first end side (speaker side) of the terminal body portion in the longitudinal direction also when the display portion is rotated to the first display position or the second display position. Thus, the satellite radio receiving antenna is arranged on the first end side (speaker side) of the terminal body portion regardless of the mobile terminal and hence the user can grasp the second side of the mobile terminal. Consequently, the satellite radio receiving antenna can be arranged on a position where a satellite radio wave is unlikely to be blocked.

In this case, the mobile terminal preferably further comprises an operating portion having a plurality of operation keys, wherein the satellite radio receiving antenna is preferably arranged on a position between the operating portion and the speaker in both of a case where the satellite radio receiving antenna is located on the first rotational position with respect to the terminal body portion and a case where the satellite radio receiving antenna is located on the second rotational position with respect to the terminal body portion. According to this structure, the satellite radio receiving antenna can be located between the operating portion and the speaker on the position of the speaker side beyond the central position of the terminal body portion in the longitudinal direction. Thus, the satellite radio receiving antenna is arranged on the position separated from the operating portion which is often covered by the user's hand or finger, and hence the satellite radio receiving antenna can be arranged on a position where a satellite radio wave is unlikely to be blocked.

In the aforementioned mobile terminal according to the aspect, the mobile terminal preferably further comprises a communication antenna performing radiotelephone communication, wherein the satellite radio receiving antenna is provided on the display portion to be movable to at least the first rotational position and the second rotational position, and the communication antenna is provided on the terminal body portion. According to this structure, a satellite radio wave can be received by always directing the direction of the directivity of the satellite radio receiving antenna in the vicinity of the zenith direction even when the display portion is rotated and a wireless communication radio wave can be transmitted/received by the communication antenna provided on the terminal body portion when the user uses the mobile terminal by changing the direction of the mobile terminal in the vertical manner or the horizontal manner.

In the aforementioned mobile terminal according to the aspect, the satellite radio receiving antenna preferably has a circularly polarized wave characteristic and is an antenna capable of receiving a satellite radio wave including positional information of a global positioning system. According to this structure, the mobile terminal capable of excellently receiving a positioning radio wave from a GPS satellites by the satellite radio receiving antenna can be formed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a mobile communication terminal 100 according to an embodiment of the present invention will be now described with reference to FIGS. 1 to 10. According to this embodiment, the present invention is applied to the mobile communication terminal 100 employed as an exemplary mobile terminal.

Figure 1:
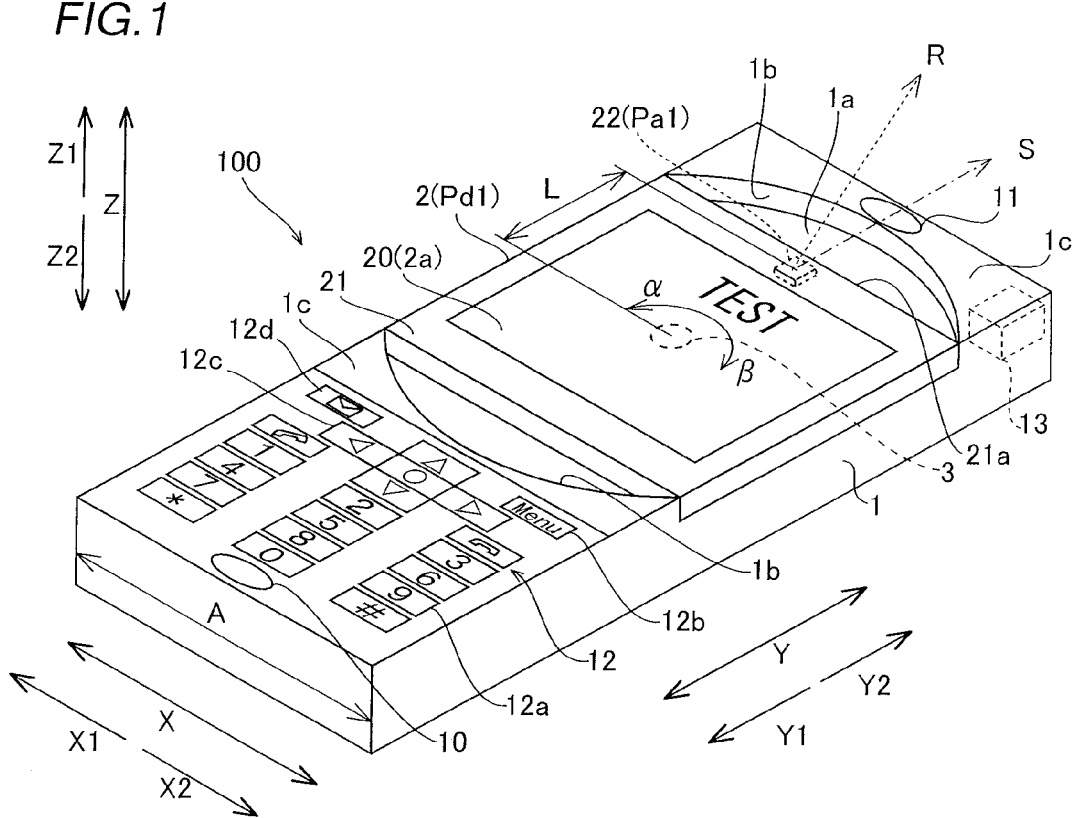
FIG. 1 is a perspective view showing an overall structure in a case where a mobile communication terminal according to an embodiment of the present invention is used in a vertical manner.
Figure 3:
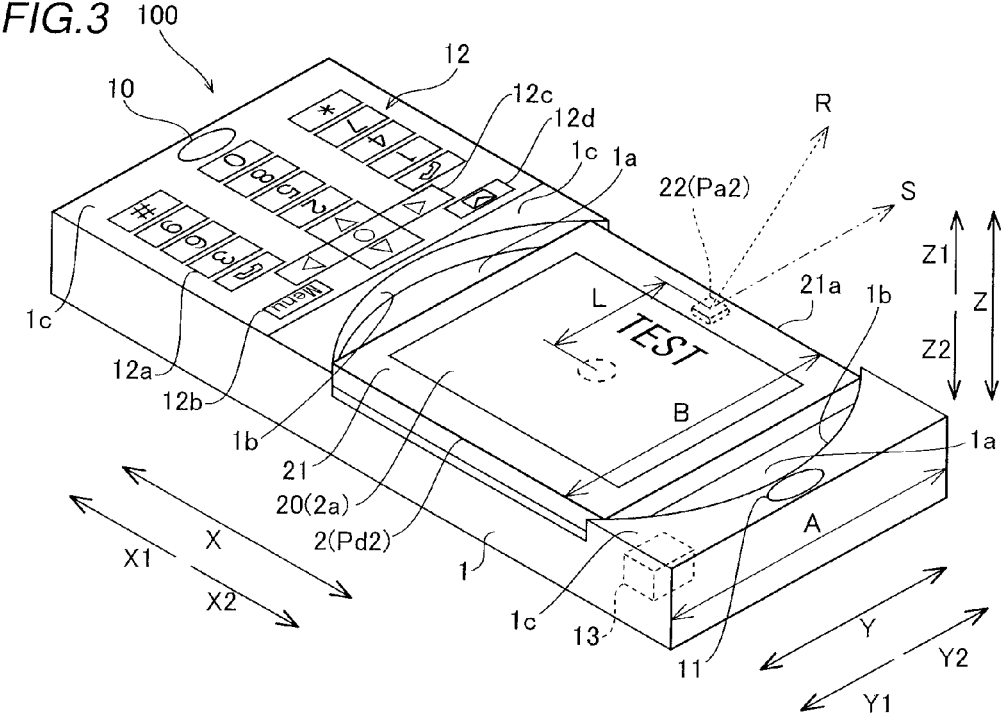
FIG. 3 is a perspective view showing an overall structure in a case where the mobile communication terminal according to the embodiment of the present invention is used in a horizontal manner.
Figure 5:
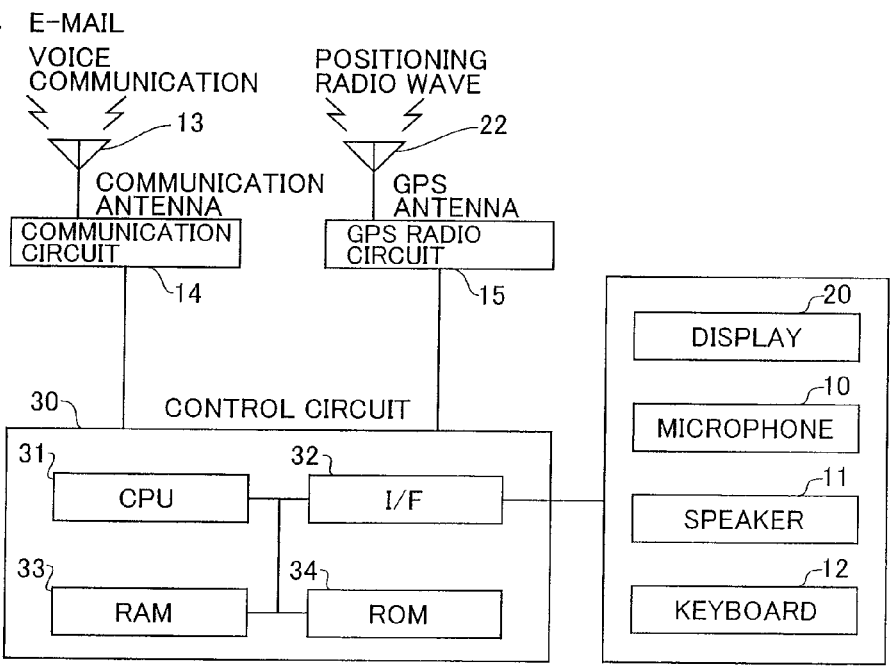
FIG. 5 is a block diagram showing an internal structure of the mobile communication terminal according to the embodiment of the present invention.

The mobile communication terminal 100 according to the embodiment of the present invention comprises a terminal body portion 1, a display portion 2, a shaft portion 3 rotatably coupling the terminal body portion 1 and the display portion 2, as shown in FIGS. 1 and 3. The terminal body portion 1 comprises a microphone 10, a speaker 11, a keyboard 12 and a communication antenna 13 (see broken lines). As shown in FIG. 5, the mobile communication terminal 100 comprises a communication circuit 14, a GPS radio circuit 15 and a control circuit 30 in the terminal body portion 1. As shown in FIGS. 1 and 3, the display portion 2 includes a display 20, a frame 21, and a GPS antenna 22. The mobile communication terminal 100 has a function (GPS function) of displaying positional information acquired by employing global positioning system (GPS) on the display portion 2. The GPS antenna 22 is an example of the "satellite radio receiving antenna" in the present invention. The display 20 and the frame 21 are examples of the "display screen portion" and the "frame body" in the present invention respectively. The keyboard 12 is an example of the "operating portion" in the present invention.

Figure 2:
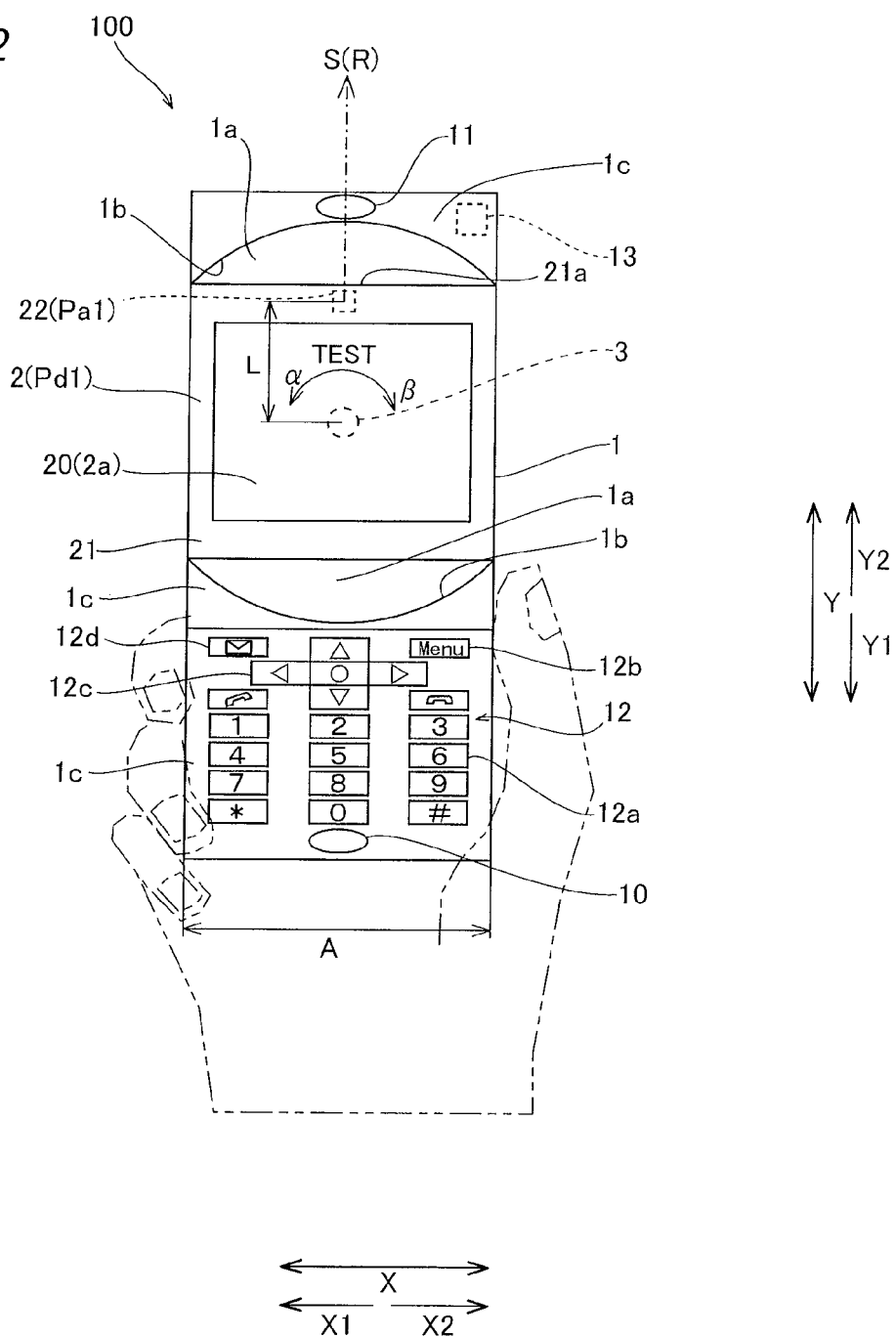
FIG. 2 is a plan view in a case where the mobile communication terminal according to the embodiment of the present invention is grasped in the vertical manner.

The terminal body portion 1 of the mobile communication terminal 100 has a plate-like rectangular shape in plan view as shown in FIG. 2. The keyboard 12 is arranged on an upper surface 1c of the terminal body portion 1, the speaker 11 is arranged in the vicinity of a first end (end on a side along arrow Y1 in FIG. 1) of the terminal body portion 1 in a longitudinal direction (direction Y in FIG. 1), and the microphone 10 is arranged in the vicinity of a second end (end on a side along arrow Y2 in FIG. 1). Recess portions 1a having wall portions 1b are formed on the upper surface 1c of the terminal body portion 1, and the frame 21 of the display portion 2 is mounted on the recess portions 1a through the shaft portion 3. The recess portions 1a are so formed that the upper surface 1c of the terminal body portion 1 and an upper surface of the display portion 2 (upper surface of the frame 21) are substantially aligned with the each other in a state of being mounted with (the frame 21 of) the display portion 2. The wall portions 1b of the terminal body portion 1 are arcuately provided on the both side surfaces of the terminal body portion 1 in the longitudinal direction (direction Y in FIGS. 1 and 2) to hold the display portion 2 therebetween. Thus, the frame 21 of the display portion 2 is formed to rotate along the wall portions 1b when the display portion 2 is rotated with respect to the terminal body portion 1 on the shaft portion 3 serving as a rotation center.

As shown in FIG. 1, the display portion 2 is arranged on a portion between the speaker 11 arranged in the vicinity of the first end (end on the side along arrow Y1 in FIG. 1) of the terminal body portion 1 and the keyboard 12 in plan view. The display 20 is fitted into the frame 21 of the display portion 2 to be fixed. The GPS antenna 22 (see dotted lines in FIG. 1) is stored in the frame 21 on an upper direction S side of display of the display portion 2. The display portion 2 has a rectangular shape in plan view, and is so mounted rotatably with respect to the terminal body portion 1 by the shaft portion 3 as to overlap with the recess portions 1a of the terminal body portion 1. As shown in FIG. 2, the display portion 2 having the rectangular shape is coupled with the shaft portion 3 on a central position in plan view, and is formed to be rotatable in the range of about 90 degrees leftward and rightward (directions α and β) on the shaft portion 3 serving as the rotation center respectively in a state of being substantially parallel to a surface of the terminal body portion 1.

Figure 4:
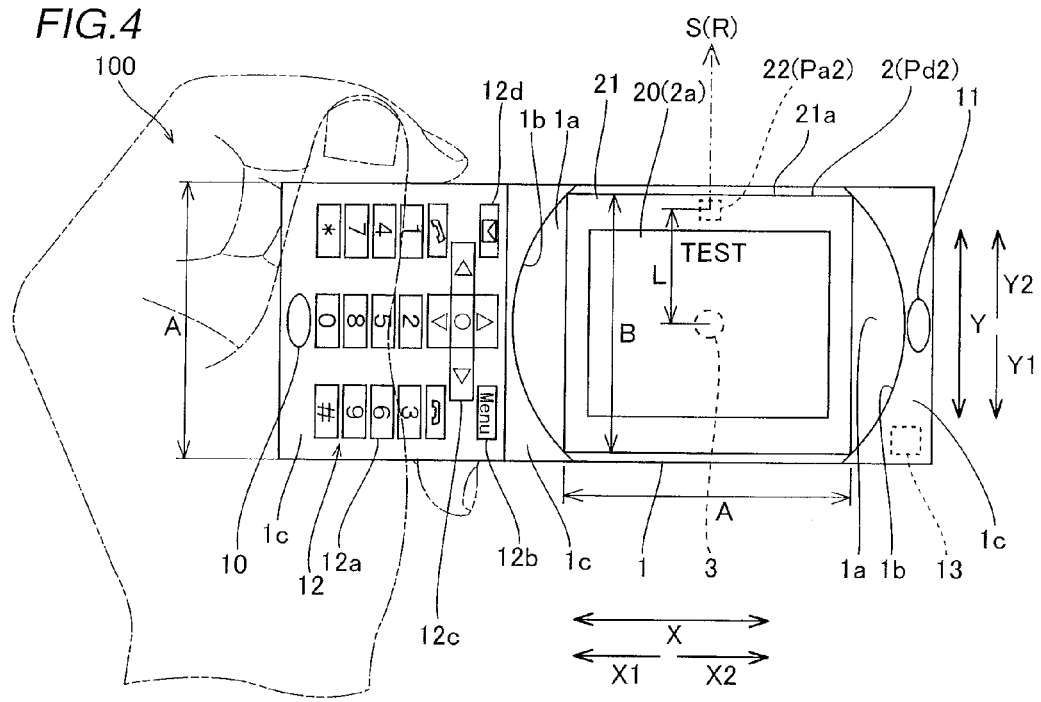
FIG. 4 is a plan view in a case where the mobile communication terminal according to the embodiment of the present invention is grasped in the horizontal manner.

When the GPS function of the mobile communication terminal 100 is used, a user must operate while confirming positional information displayed on the display portion 2 even in a state of rotating the display portion 2 by an arbitrary angle with respect to the terminal body portion 1, and hence the terminal body portion 1 is so grasped for use that the display of the display portion 2 is upper direction. For example, when the display portion 2 is arranged on a first display position Pd1 where the upper direction S of the display of the display portion 2 coincides with the longitudinal direction (arrow Y2 in FIG. 2) of the terminal body portion 1 as shown in FIG. 2, the user so holds the mobile communication terminal 100 that this arrow Y2 is upper direction of the mobile communication terminal 100. In this case, the mobile communication terminal 100 is used in a vertical manner where the longitudinal direction (direction Y in FIG. 1) of the terminal body portion 1 is a vertical direction. On the other hand, when the display portion 2 is rotated in a direction α by 90 degrees and the display portion 2 is arranged on a second display position Pd2 where the upper direction S of the display of the display portion 2 coincides with a short-side direction (arrow Y2 in FIG. 4) of the terminal body portion 1 as shown in FIG. 4, the user so holds the mobile communication terminal 100 that this arrow Y2 is upper direction of the mobile communication terminal 100. In this case, the mobile communication terminal 100 is used in the horizontal manner (longitudinal direction is a direction X) where the short-side direction (direction Y in FIG. 4) of the terminal body portion 1 is the vertical direction. Thus, the mobile communication terminal 100 is so formed that the upper direction S of the display of the display portion 2 is always upper direction of the mobile communication terminal 100.

Thus, the display portion 2 is formed to be switchable by rotating from a state where the longitudinal direction (direction Y) of the terminal body portion 1 and the vertical direction (direction Y) of the display of the display portion 2 coincide with each other as shown in FIG. 2 to a state where the short-side direction (direction X in FIG. 2) of the terminal body portion 1 and the vertical direction of the display of the display portion 2 coincide with each other so that the short-side direction of the terminal body portion 1 is the vertical direction as shown in FIG. 4. Thus, the display portion 2 is rotated by the user, so that the mobile communication terminal 100 is usable in both of the vertical manner and the horizontal manner.

The display portion 2 is formed to be located in an outline of the terminal body portion 1 in plan view in both of the state of the vertical manner arranged on the first display position Pd1 (see FIG. 2) and the state of the horizontal manner rotated to the second display position Pd2 (see FIG. 4). More specifically, the display portion 2 is so formed that a length A of the terminal body portion 1 in the short-side direction and a length of the frame 21 of the display portion 2 in the longitudinal direction (direction X in FIG. 2) equal to each other as shown in FIG. 2. On the other hand, when the display portion 2 is rotated from the state of the vertical manner in FIG. 2 to the state of the horizontal manner in FIG. 4, the short-side direction (direction Y in FIG. 4) of the display portion 2 having a length B (B<A) coincides with the short-side direction (length A) of the terminal body portion 1, and hence a longitudinal side (long side) of the display portion 2 is so formed as to be arranged inside the longitudinal side of the terminal body portion 1 in plan view in the state of the horizontal manner shown in FIG. 2. Thus, the display portion 2 is formed so as not to be arranged on a position where the display portion protrudes from the terminal body portion 1 in both of the state (see FIG. 2) of the vertical manner of the first display position Pd1 and the state (see FIG. 4) of the horizontal manner rotated to the second display position Pd2.

The shaft portion 3 holds the display portion 2 rotatably with respect to the terminal body portion 1, and is so formed that the display 20 of the display portion 2 and the control circuit 30 of the terminal body portion 1 are electrically connected to each other by inserting a wire (not shown) into the shaft portion 3. Thus, image information is outputted from the control circuit 30 to the display 20 of the display portion 2 through the shaft portion 3. The shaft portion 3 has a function of fixing rotation of the display portion 2. Therefore, the user can fix the display portion 2 on an arbitrary rotational angular position. Thus, the display portion 2 can be so fixed on a required rotational angular position that the mobile communication terminal 100 is switchable between the state (vertical manner) where the longitudinal direction of the terminal body portion 1 is the vertical position shown in FIG. 2 and the state (horizontal manner) where the short-side direction of the terminal body portion 1 is the vertical direction shown in FIG. 4.

The microphone 10 of the mobile communication terminal 100 has a function of detecting voice of the user of the mobile communication terminal 100 and converting the same to an electric signal. As shown in FIG. 5, a sound converted to the electric signal is outputted to the control circuit 30. The speaker 11 has a function of converting the electric signal outputted by the control circuit 30 to the sound and transmitting the same to the user.

The keyboard 12 has a function of outputting input information for operating the mobile communication terminal 100 by the user to the control circuit 30. As shown in FIG. 1, the user of the mobile communication terminal 100 inputs phone number, characters and the like from dial buttons 12a of the keyboard 12. The mobile communication terminal 100 is formed to perform various functions such as setting of the mobile communication terminal 100, display of the positional information acquired by employing the GPS from a function button 12b. The user performs the display function of the positional information by the GPS with operating selection buttons 12c while watching items displayed on the display portion 2, an image showing an actual location, and the like when obtaining and displaying the positional information by the GPS. The mobile communication terminal 100 is formed to perform a function regarding sent and received e-mails with the mail button 12d. The dial buttons 12a, the function button 12b, the selection buttons 12c and the mail button 12d are examples of the "operation key" in the present invention.

As shown in FIG. 5, the communication circuit 14 of the mobile communication terminal 100 has a function of transmitting/receiving a communication radio wave through the communication antenna 13 stored in the terminal body portion 1. The communication circuit 14 is enabled to perform radio communication connection to mobile phone network and the Internet through a base station. Thus, the mobile communication terminal 100 performs a phone call with other communication terminal through a phone line or sends/receives an e-mail. Information received by the communication circuit 14 is outputted to the control circuit 30.

The GPS radio circuit 15 has a function of acquiring the positional information of the mobile communication terminal 100 by the global positioning system (GPS). The GPS radio circuit 15 receives positioning radio waves from a plurality of GPS satellites 200 (see FIG. 9) through the GPS antenna 22 stored in the frame 21 of the display portion 2, and three-dimensional positioning is performed on the basis of the received information of the positioning radio wave, so that the actual location of the mobile communication terminal 100 is measured. The positional information acquired by the GPS radio circuit 15 is outputted to the control circuit 30.

The display 20 of the display portion 2 has a function of displaying image information outputted by the control circuit 30. The image information includes data such as the positional information of the mobile communication terminal 100 by the GPS, phone numbers in call registers, contents of e-mails and setting information of the mobile communication terminal 100 in addition to image data. According to this embodiment, a display direction of an image displayed on the display portion 2 (display 20) is fixed with respect to the display portion 2, and the display direction of the image displayed on the display portion 2 (display 20) is rotated with respect to the terminal body portion 1 by the rotational amount of the display portion 2 when the display portion 2 is rotated between the first display position Pd1 and the second display position Pd2. Thus, according to this embodiment, the mobile communication terminal 100 is usable in both of the state of the vertical manner shown in FIG. 2 and the state of the horizontal manner shown in FIG. 4 while the display of the display portion 2 with respect to the terminal body portion 1 is rotated by rotating the display portion 2 itself to the first display position Pd1 and the second display position Pd2, and hence the display direction of the image (characters "TEST" in FIGS. 1 to 4, for example) displayed on the display 20 is not changed. Thus, the image information outputted from the control circuit 30 may not be changed between the case of use in the vertical manner and the case of use in the horizontal manner. Thus, control of the mobile communication terminal 100 is simplified and a load in execution of processing of image display by a CPU 31 described later can be suppressed, as compared with the case where the direction of the image information outputted from the control circuit 30 is changed between the case of use in the vertical manner and the case of use in the horizontal manner.

As shown in FIG. 1, the display 20 is fixed and protected to enclose an outer periphery of the display 20, so that the frame 21 forms an outer peripheral portion of the display portion 2. The frame 21 stores the GPS antenna 22 in the outer peripheral portion. The frame 21 has a function of integrally rotating the display portion 2 (display 20) and the GPS antenna 22 when the display portion 2 rotates to the first display position Pd1 and the second display position Pd2 by storing the GPS antenna 22 in the outer peripheral portion. More specifically, when the upper direction S of the display of the display portion 2 is directed in the longitudinal direction of the terminal body portion 1 (when the display portion 2 is located on the first display position Pd1), the GPS antenna 22 is arranged on a first rotational position Pa1, as shown in FIG. 2. As shown in FIG. 4, when the display portion 2 is rotated by about 90 degrees in the direction α and the upper direction S of the display of the display portion 2 is directed in the short-side direction of the terminal body portion 1 (when the display portion 2 is located on the second display position Pd2), the GPS antenna 22 stored in the frame 21 is also rotated, and hence is moved to the second rotational position Pa2. Thus, the position of the GPS antenna 22 with respect to the display direction of the image ("TEST" in FIG. 1, for example) displayed on the display portion 2 is not changed also when the display portion 2 rotates with respect to the terminal body portion 1. At this time, also when the GPS antenna 22 is located on either one of the first rotational position Pa1 and the second rotational position Pa2, the direction of the GPS antenna 22 with respect to the display direction of the image displayed on the display portion 2 is not changed and the directivity in a direction R, described later, of the GPS antenna 22 with respect to the display direction of the image displayed on the display portion 2 is not changed.

Figure 6:
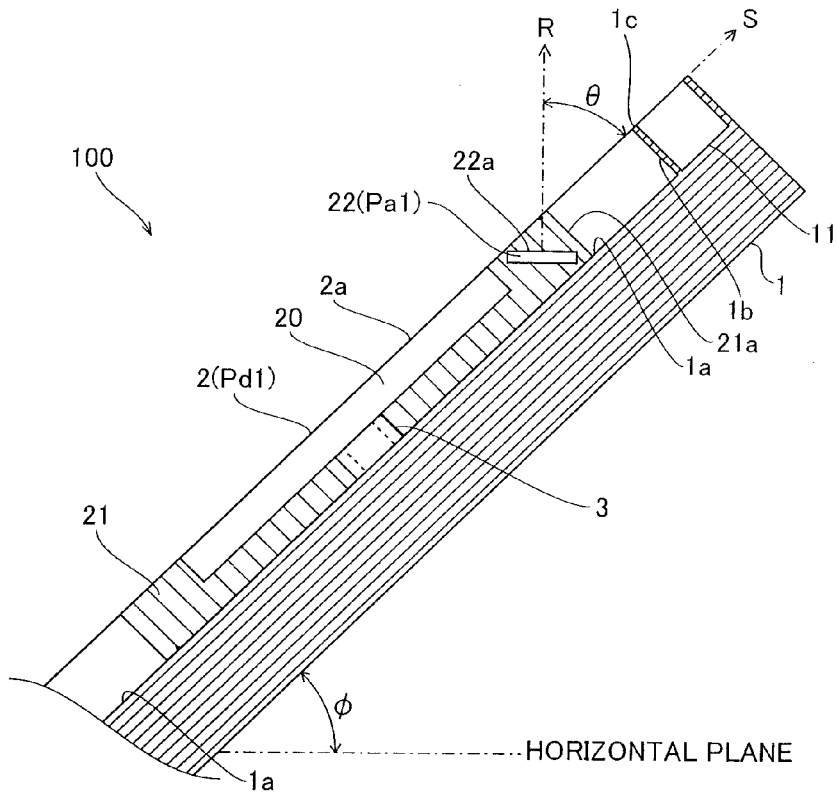
FIG. 6 is a schematic diagram showing an angle at which the mobile communication terminal according to the embodiment of the present invention is held and an angle of a GPS antenna
Figure 9:
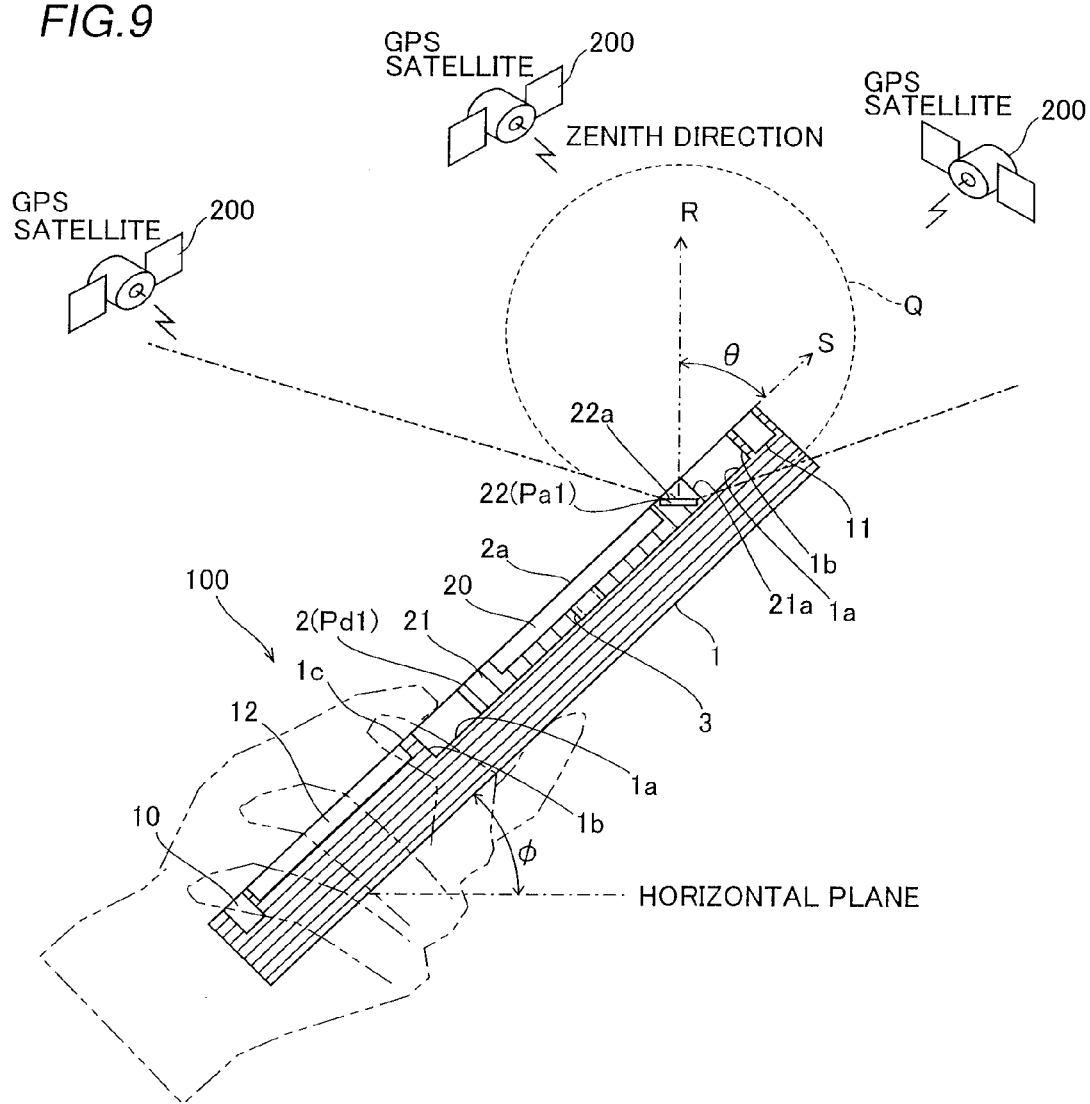
FIG. 9 is a schematic diagram for illustrating a direction of directivity of the GPS antenna in a case where the mobile communication terminal according to the embodiment of the present invention is used in the vertical manner.

As shown in FIG. 6, the GPS antenna 22 has unidirectionality in the upper direction (direction R) with respect to an antenna surface 22a, and a circularly polarized wave characteristic. As shown in FIG. 9, this GPS antenna 22 has wide directivity pattern Q in the upper direction (in the direction R) with respect to the antenna surface 22a, and hence satellite radio waves (positioning radio waves) from the GPS satellites 200 can be received in the widest range in a state where the directivity of the direction R of the GPS antenna 22 is directed in the zenith direction (GPS satellites 200 side) Thus, the satellite radio waves (positioning radio waves) from the plurality of GPS satellites 200 located on different positions can be suitably received.

As shown in FIG. 1, the GPS antenna 22 stored in the display portion 2 is provided on an upper direction S side of the display of the display portion 2 in the frame 21. More specifically, the GPS antenna 22 is arranged on a position in the vicinity of an end surface 21a of the frame 21 on the upper direction S side of the display of the display portion 2 and is arranged in the vicinity of a central portion in a horizontal direction (direction X in FIG. 2) of the display of the display portion 2, as shown in FIG. 2. Therefore, in both of the case where the attitude of the mobile communication terminal 100 is in the vertical manner and the case where the attitude thereof is in the horizontal manner, as shown in FIGS. 1 and 3, the GPS antenna 22 is arranged in the upper direction of the mobile communication terminal 100 by moving to the first rotational position Pa1 and the second rotational position Pa2.

The GPS antenna 22 is located at a position separated by a distance L from the shaft portion 3 serving as the rotation center of the display portion 2 with respect to the terminal body portion 1. Therefore, when the display portion 2 is rotated from the first display position Pd1 (see FIG. 2) to the second display position Pd2 (see FIG. 4) and the GPS antenna 22 moves from the first rotational position Pa1 to the second rotational position Pa2, the GPS antenna 22 is rotated on an arc having a radius L on a center of the shaft portion 3. At this time, in both of the case where the GPS antenna 22 is located on the first rotational position Pa1 with respect to the terminal body portion 1 and the case where the GPS antenna 22 is located on the second rotational position Pa2 with respect to the terminal body portion 1, the GPS antenna 22 is located in the outline of the terminal body portion 1 in plan view. Further, when the GPS antenna 22 is arranged on the second rotational position Pa2, the GPS antenna 22 is formed to be arranged inside (side along arrow Y1 in FIG. 4) the terminal body portion 1 beyond the long side having the length A of the display portion 2 (frame 21), as shown in FIG. 4. As shown in FIGS. 2 and 4, in both of the case where the GPS antenna 22 is located on the first rotational position Pa1 with respect to the terminal body portion 1 and the case where the GPS antenna 22 is located on the second rotational position Pa2 with respect to the terminal body portion 1, the GPS antenna 22 is formed to be arranged on the position on a side of the speaker 11 beyond the central position of the terminal body portion 1 in the longitudinal direction. In both of the case where the GPS antenna 22 is located on the first rotational position Pa1 with respect to the terminal body portion 1 and the case where the GPS antenna 22 is located on the second rotational position Pa2 with respect to the terminal body portion 1, the GPS antenna is formed to be arranged between the keyboard 12 and the speaker As shown in FIG. 6, the GPS antenna 22 stored in the display portion 2 is fixedly set to have an angle θ in the upper direction (along arrow Z1 in FIG. 1) with respect to a display surface 2a of the display portion 2 (display 20) from the upper direction S of the display of the display portion 2 (display 20). The angle θ is set in the range of at most about 30 degrees and not more than about 60 degrees. According to this embodiment, this angle θ is set to about 45 degrees. The GPS antenna 22 is arranged on a height position (position in a thickness direction of the terminal body portion 1) between the upper surface 1c of the terminal body portion 1 and bottom surfaces of the recess portions 1a.

Figure 7:
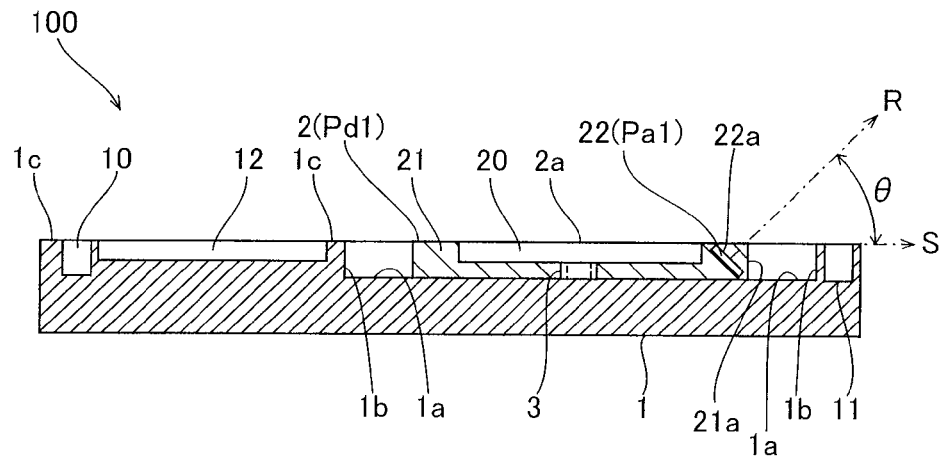
FIG. 7 is a vertically sectional view schematically showing arrangement of the GPS antenna in a case where the mobile communication terminal shown in FIG. 1 is used in the vertical manner.
Figure 8:
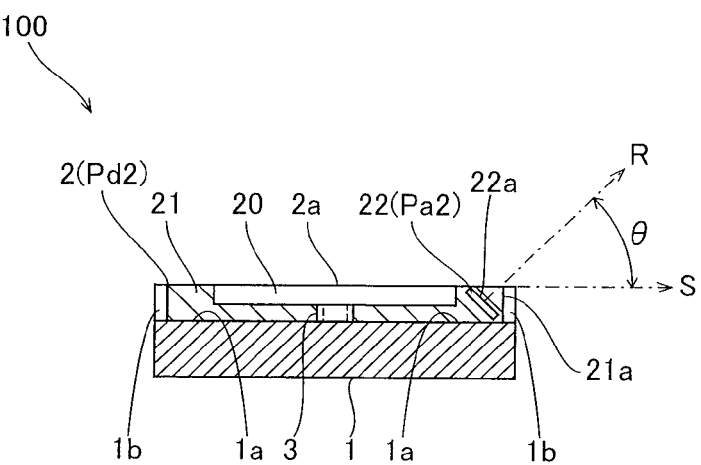
FIG. 8 is a vertically sectional view schematically showing arrangement of the GPS antenna in a case where the mobile communication terminal shown in FIG. 3 is used in the horizontal manner.

As hereinabove described, when the upper direction S of the display of the display portion 2 is the longitudinal direction of the mobile communication terminal 100, the GPS antenna 22 is arranged on the first rotational position Pa1 and is fixedly set to have the angle θ=45 degrees from the upper direction S of the display of the display portion 2 with respect to the display surface 2a of the display portion 2, as shown in FIG. 7. As shown in FIG. 8, when the upper direction S of the display of the display portion 2 is the short-side direction of the mobile communication terminal 100, the GPS antenna 22 is arranged on the second rotational position Pa2 and is fixedly set to have the angle θ=45 degrees from the upper direction S of the display of the display portion 2 with respect to the display surface 2a of the display portion 2. Therefore, in both of the case where the GPS antenna 22 is arranged on the first rotational position Pa1 (when the mobile communication terminal 100 is in the vertical manner) and the case where the GPS antenna 22 is arranged on the second rotational position Pa2 (when the mobile communication terminal 100 is in the horizontal manner), the direction R of the directivity of the GPS antenna 22 is directed in the same direction, inclined at angle θ (=45 degrees) with respect to the display surface 2a of the display portion 2 in the state of so holding that the upper direction S of the display of the display portion 2 is upper direction of the terminal body portion 1, as shown in FIGS. 7 and 8.

Figure 10:
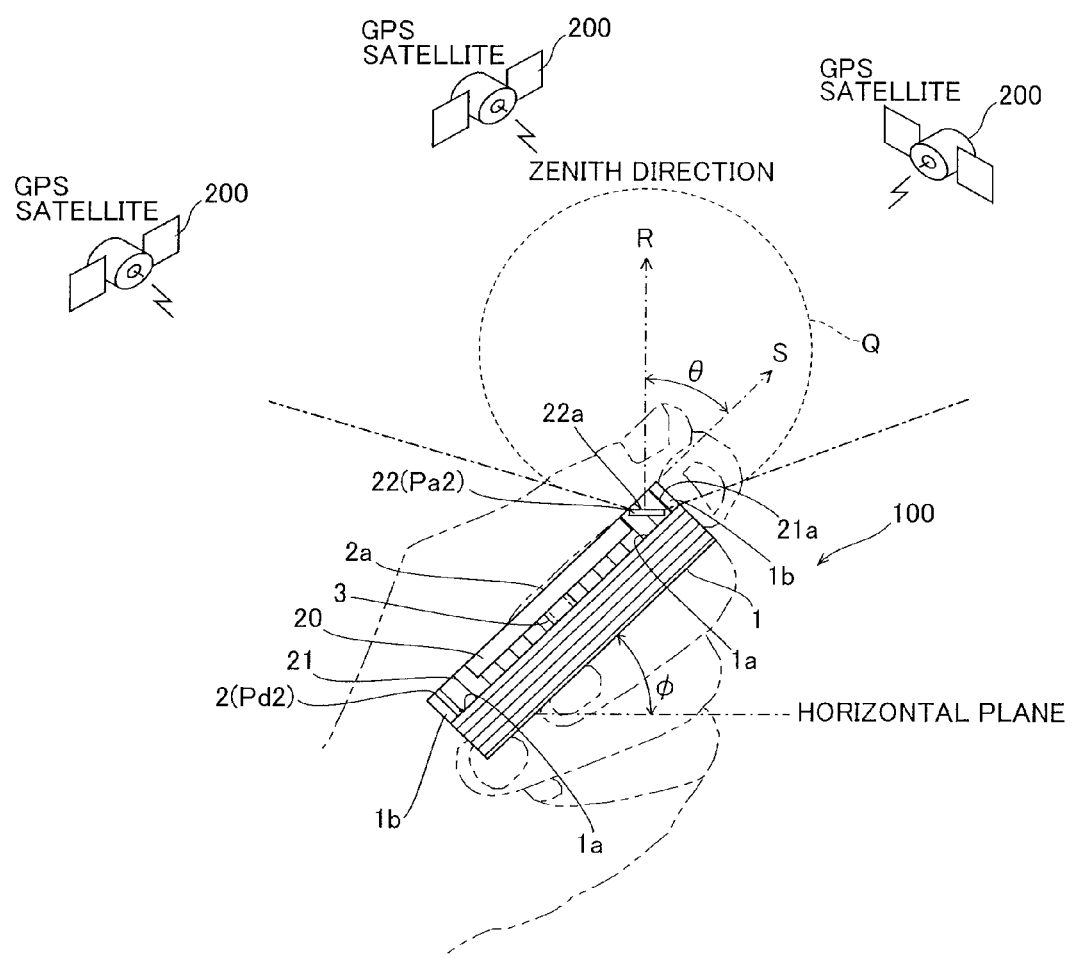
FIG. 10 is a schematic diagram for illustrating a direction of directivity of the GPS antenna in a case where the mobile communication terminal according to the embodiment of the present invention is used in the horizontal manner.

According to this embodiment, the user generally must operate the selection buttons 12c while watching the image displayed on the display portion 2 when grasping the mobile communication terminal 100 and using the function of displaying the positional information acquired by the GPS on the display portion 2, as shown in FIG. 6. Therefore, in order that the display portion 2 is at an easily visible angle for the user, the mobile communication terminal 100 is used in a state of holding the terminal body portion 1 so as to incline the upper direction S of the display of the display portion 2 by a prescribed angle φ from the horizontal plane. The angle φ (inclination angle with respect to the horizontal plane of the display surface 2a of the display portion) for holding the mobile communication terminal 100 is conceivably about 45 degrees. In this case, the direction R of the directivity of the GPS antenna 22 is a direction of angle θ=about 45 degrees from the upper direction S of the display of the display portion 2 with respect to the display surface 2a of the display portion 2, and hence the direction R of the directivity of the GPS antenna 22 is directed in the vertically upper direction of about 45 degrees+about 45 degrees=about 90 degrees from the horizontal plane. Thus, according to this embodiment, when the user grasps the mobile communication terminal 100 while watching the display portion 2, the directivity of the GPS antenna 22 is directed in the zenith direction (vertically upper direction) in both of the case of the first rotational position Pa1 where the mobile communication terminal 100 is in the vertical manner and the case of the second rotational position Pa2 where the mobile communication terminal 100 is in the horizontal manner. In other words, when the GPS antenna 22 is arranged on the first rotational position Pa1 and the upper direction S of the display of the display portion 2 is the longitudinal direction of the terminal body portion 1, the directivity of the GPS antenna 22 is directed in the zenith direction (direction R in FIG. 9), as shown in FIG. 9. Similarly, as shown in FIG. 10, when the GPS antenna 22 is arranged on the second rotational position Pa2 and the upper direction S of the display of the display portion 2 is the short-side direction of the terminal body portion 1, the directivity of the GPS antenna 22 is directed in the zenith direction (direction R in FIG. 10).

Thus, according to this embodiment, the directivity of the GPS antenna 22 is always directed in the zenith direction regardless of the attitude of the mobile communication terminal 100, in a state the upper direction S of the display of the display portion 2 is upper direction of the terminal body portion 1 (mobile communication terminal 100) and the terminal body portion 1 is held to be inclined by the angle φ with respect to the horizontal plane, when the display function of the positional information by the GPS is used.

As shown in FIG. 5, the mobile communication terminal 100 is controlled by the control circuit 30. The control circuit 30 includes the CPU (central processing unit) 31, an I/F (interface) 32, a RAM (random access memory) 33, a ROM (read only memory) 34.

The CPU 31 of the control circuit 30 is formed to execute entire control of the mobile communication terminal 100. In other words, the CPU 31 is formed to control communication of the mobile communication terminal 100 through the communication circuit 14, acquire positional information through the GPS radio circuit 15 and control the microphone 10, the speaker 11, the keyboard 12 and the display 20. The CPU 31 has a function of reading program from the ROM 34 to execute a prescribed function and storing device setting information of the mobile communication terminal 100, sent/received e-mails, image data, positional information and the like in the RAM 33. When using the display function of the positional information by the GPS, the CPU 31 acquires the positional information through the GPS radio circuit 15 on the basis of the input information of the keyboard 12 and outputs the acquired image of the actual location of the mobile communication terminal 100 to the display 20.

The control circuit 30 is connected to the microphone 10, speaker 11, the keyboard 12 and the display 20 through the I/F 32. The control of the microphone 10, the speaker 11, the keyboard 12 and the display 20 and input and output of the information by the CPU 31 are executed through the I/F 32.

The RAM 33 of the control circuit 30 has a function of rewritably storing temporary data generated following the control by the CPU 31, sent/received e-mails, setting information, various histories and the like. The ROM 34 stores a program for executing various functions by the CPU 31 such as acquisition of the positional information by the GPS.

According to this embodiment, as hereinabove described, the single GPS antenna 22 provided on the display portion 2 to integrally rotate with the display portion 2 and having unidirectionality in the upper direction (direction R) is so set that the direction R of the directivity of the single GPS antenna 22 is a direction inclined upward with respect to the display surface 2a of the display portion 2 by the prescribed angle θ to be directed in the zenith direction in both of the case where the GPS antenna 22 is located on the first rotational position Pa1 and the case where the GPS antenna 22 is located on the second rotational position Pa2, when the user holds to incline the terminal body portion 1 and the display surface 2a of the display portion 2 obliquely with respect to the horizontal plane in a state where the upper direction S of the display of the display portion 2 is the upper direction of the terminal body portion 1 in use of the terminal body portion 1. Thus, the directivity of the GPS antenna 22 is directed in the zenith direction on both of the first rotational position Pa1 and the second rotational position Pa2 following the rotation of the display portion 2, also when the user rotates the display portion 2 and the display of the display portion 2 is directed in the upper direction S in view of visibility and the terminal body portion 1 is held in a state where the display surface 2a is inclined by the angle φ with respect to the horizontal plane. Consequently, the directivity of the GPS antenna 22 can be directed in the zenith direction also when the user grasps the mobile communication terminal 100 and changes the direction of the mobile communication terminal in the vertical manner (see FIG. 9) and in the horizontal manner (see FIG. 10) for use.

When the user uses the mobile communication terminal 100 while watching the display portion 2, the mobile communication terminal 100 is so held that the upper direction S of the display of the display portion 2 is always upward. Thus, the terminal body portion 1 is provided with the display portion 2 mounted to be rotatable to the first display position Pd1 and the second display position Pd2 while being substantially parallel to the surface of the terminal body portion 1 and the single GPS antenna 22 provided on the display portion 2 to be rotate integrally with the display portion 2, whereby it is possible that the position of the GPS antenna 22 with respect to the upper direction S of the display of the display portion 2 is not changed even when the display portion 2 is rotated in a case where the user changes the direction of the mobile communication terminal 100 in the vertical manner, the horizontal manner and the like for use. Thus, a plurality of antennas and a switching portion of the antennas may not be provided separately in order to correspond to each of the cases of the vertical manner and the horizontal manner also when the user changes the direction of the mobile communication terminal 100, and hence increase of the number of components can be suppressed. When the mobile communication terminal 100 is grasped for use, the terminal body portion 1 is generally held while inclining the terminal body portion 1 by the angle φ at which the user is easily to watch the display portion 2. Therefore, in a case where the upper direction S of the display of the display portion 2 is the upper direction of the terminal body portion 1 and the terminal body portion 1 is held to be obliquely inclined when using the terminal body portion 1, the direction R of the directivity of the single GPS antenna 22 is set to be a direction inclined by the prescribed angle θ with respect to the display surface 2a of the display portion 2 so that the direction R of the directivity is directed in the zenith direction also when the GPS antenna 22 is located on both of the first rotational position Pa1 and the second rotational position Pa2. Thus, the directivity of the GPS antenna 22 can be directed in the zenith direction while inclining the terminal body portion 1 for use, also when the user grasps the terminal body portion 1 of the mobile communication terminal 100 for use.

According to this embodiment, as hereinabove described, the prescribed angle θ of the GPS antenna 22 with respect to the display surface 2a of the display portion 2 is at most 30 degrees and not more than 60 degrees, whereby the terminal body portion 1 is generally held while inclining the display portion 2 by the angle φ of about 45 degrees with respect to a horizontal direction so that the user easily watches the display portion 2, when the user grasps the terminal body portion 1 and uses the GPS function, and hence the direction R of the directivity of the GPS antenna 22 has the angle θ of 45 degrees with respect to the display surface 2a of the display portion 2 inclined by 45 degrees from the horizontal direction in the state of grasping the terminal body portion 1, and the direction R of the directivity of the GPS antenna 22 can be substantially 90 degrees (zenith direction) with respect to the horizontal direction. Thus, the directivity of the GPS antenna 22 having unidirectionality upward can be directed in the zenith direction in the state of grasping the terminal body portion 1 for use.

According to this embodiment, as hereinabove described, the prescribed angle θ is about 45 degrees, whereby the direction R of the directivity of the GPS antenna 22 can be substantially 90 degrees (zenith direction) with respect to the horizontal direction in a state where the display portion 2 is so inclined by the angle φ of about 45 degrees with respect to the horizontal direction that the user grasps the terminal body portion 1 and easily watches the display portion 2. Thus, receiver sensitivity of the GPS antenna 22 can be brought into the best condition in the state where the display portion 2 is so inclined by the angle φ of about 45 degrees with respect to the horizontal direction so that the user easily watches the display portion 2.

According to this embodiment, as hereinabove described, the display portion 2 is provided to be rotatable by 90 degrees leftward and rightward (directions α and β in FIG. 1) respectively, and the GPS antenna 22 provided on the display portion 2 is arranged on the position on the upper direction S side of the display of the display portion 2, whereby the mobile communication terminal 100 can be easily used in the vertical manner (see FIG. 2) and the horizontal manner (see FIG. 4) by rotating the display portion 2 by 90 degrees and the GPS antenna 22 can be arranged on the upper direction S side of the display portion 2 in use regardless of the direction of the mobile communication terminal 100. Thus, the satellite radio wave is not blocked by the terminal body portion 1, the display portion 2 or the like dissimilarly to a case where the GPS antenna 22 is arranged on a lower side of the display portion 2 or the terminal body portion 1 by the direction of the mobile communication terminal 100, and hence excellent receiver sensitivity can be maintained regardless of the direction of the mobile communication terminal 100.

According to this embodiment, as hereinabove described, the GPS antenna 22 is arranged in the vicinity of the central portion of the display of the display portion 2 in the horizontal direction (direction X in FIG. 2), whereby the GPS antenna 22 can be arranged on a position where the positioning radio wave is unlikely to be blocked by a user's finger or the like dissimilarly to a case where the GPS antenna 22 is arranged in the vicinity of the end of the display of the display portion 2 in the horizontal direction.

According to this embodiment, as hereinabove described, the GPS antenna 22 is arranged on the position in the vicinity of the end surface 21a of the frame 21 on the upper direction S side of the display of the display portion 2, whereby the GPS antenna 22 can be arranged on the most upper side of the terminal body portion 1 in the frame 21 of the display portion 2. Thus, excellent receiver sensitivity of the GPS antenna 22 can be more easily maintained without blocking a satellite radio wave by other portion of the mobile communication terminal 100.

According to this embodiment, as hereinabove described, the GPS antenna 22 is arranged in the frame 21 of the display portion 2, whereby the GPS antenna 22 is not exposed on the outside of the frame 21, and hence an impact can be inhibited from externally applying to the GPS antenna 22 where the direction R of the directivity is set to the direction inclined by the prescribed angle θ with respect to the display surface 2a of the display portion 2.

According to this embodiment, as hereinabove described, the GPS antenna 22 is so arranged in the frame 21 of the display portion 2 that the direction R of the directivity is inclined upward by the prescribed angle θ with respect to the display surface 2a of the display portion 2, whereby the GPS antenna 22 can be easily so arranged that the direction R of the directivity of the GPS antenna 22 is inclined upward by the prescribed angle θ with respect to the display surface 2a of the display portion 2 by simply fixedly mounting the GPS antenna 22 in the frame 21 while inclining the GPS antenna 22 by the prescribed angle θ.

According to this embodiment, as hereinabove described, the terminal body portion 1 has a rectangular shape in plan view, the vertical direction of the display of the display portion 2 is the longitudinal direction of the terminal body portion 1 when the display portion 2 is located on the first display position Pd1 and the GPS antenna 22 is located on the first rotational position Pa1, and the vertical direction of the display of the display portion 2 is the short-side direction of the terminal body portion 1 when the display portion 2 is located on the second display position Pd2 and the GPS antenna 22 is located on the second rotational position Pa2, whereby the GPS antenna 22 is located on the first rotational position Pa1 when the longitudinal direction of the rectangular terminal body portion 1 is directed in the vertical direction to use the mobile communication terminal 100 in the vertical manner (see FIG. 2), and the GPS antenna 22 is located on the second rotational position Pa2 when the longitudinal direction of the rectangular terminal body portion 1 is directed in the horizontal direction to use the mobile communication terminal 100 in the horizontal manner (see FIG. 4), and hence the mobile communication terminal 100 can be used in the state where the directivity of the GPS antenna 22 is always directed in the zenith direction also when the mobile communication terminal 100 is used in the vertical manner (the longitudinal direction is the vertical direction of the display) or in the horizontal manner (the short-side direction is the vertical direction of the display).

According to this embodiment, as hereinabove described, the display portion 2 is provided to overlap with the recess portions 1a of the rectangular terminal body portion 1 in plan view, and the display portion 2 is located in the outline of the rectangular terminal body portion 1 in plan view also when the display portion 2 is so rotated to the first display position Pd1 or the second display position Pd2 that the GPS antenna 22 is located on the first rotational position Pa1 or the second rotational position Pa2 with respect to the terminal body portion 1, whereby the display portion 2 does not protrude from the outline of the rectangular terminal body portion 1 in plan view in both of the case where the GPS antenna 22 is located on the first rotational position Pa1 with respect to the terminal body portion 1 and the case where the GPS antenna 22 is located on the second rotational position Pa2 with respect to the terminal body portion 1, and hence the mobile communication terminal 100 can be used without loosing easy holding and operability, even when the attitude of the mobile communication terminal 100 is changed in the vertical manner (see FIG. 2) or in the horizontal manner (see FIG. 4).

According to this embodiment, as hereinabove described, the GPS antenna 22 is provided on the frame 21 of the display portion 2 separated from the prescribed distance L from the rotation center (shaft portion 3) of the display portion 2 with respect to the terminal body portion 1, whereby the display by display 20 of the display portion 2 is not hindered even when the GPS antenna 22 is provided on the display portion 2.

According to this embodiment, as hereinabove described, the display direction of the image displayed on the display portion 2 is fixed with respect to the display portion 2, the display direction of the image displayed on the display portion 2 is rotated with respect to the terminal body portion 1 by the rotational amount of the display portion 2 when the display portion 2 is rotated between the first display position Pd1 (see FIG. 2) and the second display position Pd2 (see FIG. 4), and the direction R of the directivity of the GPS antenna 22 with respect to the display direction of the image displayed on the display portion 2 is not changed also when the display portion 2 is rotated between the first display position Pd1 and the second display position Pd2 with respect to the terminal body portion 1, whereby the direction R of the directivity of the GPS antenna 22 with respect to the display direction of the image displayed on the display portion 2 is not changed also when the display portion 2 is rotated between the first display position Pd1 and the second display position Pd2 and the direction of the mobile communication terminal 100 is so changed that the upper direction S of the image displayed on the display portion 2 is upward, and hence change (rotation) of the display direction of the image displayed on the display portion 2 may not be controlled corresponding to the rotational position of the display portion 2 and the control of the mobile terminal can be simplified. The display direction of the image and the direction R of the directivity of the GPS antenna 22 can correspond to each other without employing a dedicated sensor dissimilarly to a case where a sensor for detecting the direction of the mobile communication terminal 100 must be provided when changing the display direction following the change of the direction of the display portion 2 or the terminal body portion 1.

According to this embodiment, as hereinabove described, the GPS antenna 22 is located on the position in the vicinity of the outline of the rectangular terminal body portion 1 in plan view when the GPS antenna 22 is located on the second rotational position Pa2 with respect to the terminal body portion 1, whereby the GPS antenna 22 can be arranged on the position in the vicinity of the outline on the upper side (the upper direction S side of the display of the display portion 2) of the terminal body portion 1 also when the rectangular mobile communication terminal 100 (terminal body portion 1) is used in the horizontal manner (see FIG. 4). Thus, the GPS antenna 22 can be arranged on the position where a satellite radio wave is unlikely to be blocked by the display portion also when the rectangular mobile communication terminal 100 (terminal body portion 1) is used in the horizontal manner.

According to this embodiment, as hereinabove described, the GPS antenna 22 provided on the display portion 2 (frame 21) is located in the outline of the rectangular terminal body portion 1 in plan view in both of the case where the GPS antenna 22 is located on the first rotational position Pa1 with respect to the terminal body portion land the case where the GPS antenna 22 is located on the second rotational position Pa2 with respect to the terminal body portion 1, whereby the GPS antenna 22 does not protrude to the outside of the rectangular shape terminal body portion in plan view in both of the case where the GPS antenna 22 is located on the first rotational position Pa1 with respect to the terminal body portion 1 and the case where the GPS antenna 22 is located on the second rotational position Pa2 with respect to the terminal body portion 1, and hence an impact can be inhibited from externally applying to the GPS antenna 22.

According to this embodiment, as hereinabove described, the display portion 2 having the rectangular shape in plan view is so provided that the long side of the display portion 2 is arranged inside from the outline of the rectangular terminal body portion 1 (see FIG. 4) in plan view when the display portion 2 is rotated to the second display position Pd2 with respect to the terminal body portion 1, and the GPS antenna 22 is arranged inside of the terminal body portion 1 beyond the long side of the display portion 2 in plan view when the display portion 2 is rotated to the second display position Pd2 with respect to the terminal body portion 1 in plan view when the GPS antenna 22 is arranged on the second rotational position Pa2 by rotating the display portion 2 to the second display position Pd2, whereby the GPS antenna 22 is arranged not only inside beyond the outline of the terminal body portion 1 but also inside of the terminal body portion 1 beyond the long side of the display portion 2, and hence an impact can be inhibited from externally applying to the GPS antenna 22.

According to this embodiment, as hereinabove described, the GPS antenna 22 is arranged on the height position between the upper surface 1c of the terminal body portion 1 and the bottom surfaces of the recess portions 1a, whereby the GPS antenna 22 does not protrude in the height direction (thickness direction) of the terminal body portion 1. Thus, an impact can be inhibited from externally applying to the GPS antenna 22 so arranged that the direction R of the directivity is inclined by the prescribed angle $\theta$.

According to this embodiment, as hereinabove described, the GPS antenna 22 is arranged on the speaker 11 side with respect to the central position of the terminal body portion 1 in the longitudinal direction (direction X in FIG. 4) when the display portion 2 is so rotated to the first display position Pd1 or the second display position Pd2 that the GPS antenna 22 is located on the first rotational position Pa1 or the second rotational position Pa2 with respect to the terminal body portion 1, whereby the GPS antenna 22 can be arranged on the first end side (speaker 11 side) of the terminal body portion 1 in the longitudinal direction when the display portion 2 is rotated to the first display position Pd1 or the second display position Pd2. Thus, the GPS antenna 22 is arranged on the first end side (speaker 11 side) of the terminal body portion 1 and hence the user can grasp the second side (microphone 10 side) of the mobile communication terminal 100 (terminal body portion 1). Consequently, the GPS antenna 22 can be arranged on a position where a satellite radio wave is unlikely to be blocked.

According to this embodiment, as hereinabove described, the GPS antenna 22 is located between the keyboard 12 and the speaker 11 in both of the case where the GPS antenna 22 is located on the first rotational position Pa1 with respect to the terminal body portion 1 and the case where the GPS antenna 22 is located on the second rotational position Pa2 with respect to the terminal body portion 1, whereby the GPS antenna 22 can be located between the keyboard 12 and the speaker 11 on the position of the speaker 11 side beyond the central position of the terminal body portion 1. Thus, the GPS antenna 22 is arranged on a position separated from the keyboard 12 which is often covered by the user's hand or finger, and hence the GPS antenna 22 can be arranged on a position where a satellite radio wave is unlikely to be blocked.

According to this embodiment, as hereinabove described, the GPS antenna 22 is provided on the display portion 2 to be movable to the first rotational position Pa1 and the second rotational position Pa2, and the communication antenna 13 is provided on the terminal body portion 1, whereby a satellite radio wave can be received by always directing the direction R of the directivity of the GPS antenna 22 in the vicinity of the zenith direction even when the display portion 2 is rotated and a wireless communication radio wave can be transmitted/received by the communication antenna 13 provided on the terminal body portion 1 when the user uses the mobile communication terminal 100 by changing the direction of the mobile communication terminal 100 in the vertical manner (see FIG. 2) or the horizontal manner (see FIG. 4).

According to this embodiment, as hereinabove described, the GPS antenna 22 has a circularly polarized wave characteristic and is formed to be an antenna capable of receiving a positioning radio wave of the global positioning system (GPS), whereby the mobile communication terminal 100 capable of excellently receiving a positioning radio wave from the GPS satellites 200 by the GPS antenna 22 can be formed.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the mobile communication terminal 100 employed as an exemplary mobile terminal in the aforementioned embodiment, the present invention is not restricted to this but is also widely applicable to mobile terminals such as a portable GSP terminal having no communication function as a mobile phone, a personal digital assistance (PDA) and a portable game device other than the mobile communication terminal. In other words, the present invention is applicable to a mobile terminal so far as the mobile terminal comprises a terminal body portion, a display portion and a satellite radio receiving antenna.

While the terminal body portion 1 of the mobile communication terminal 100 has the plate-like rectangular shape in plan view, is arranged with the keyboard 12 and rotatably mounted with the display portion 2 in the aforementioned embodiment, the present invention is not restricted to this but the terminal body portion may have a folding structure constituted by an upper terminal body portion rotatably provided with a display portion and a lower terminal body portion provided with a keyboard, for example.

While the present invention is applied to the GPS antenna 22 employed as an exemplary satellite radio receiving antenna in the aforementioned embodiment, the present invention is not restricted to this but is also applicable to an antenna receiving a satellite radio wave other than the antenna receiving the positioning radio wave by the GPS.

While the GPS antenna 22 is fixedly set to have the angle $\theta$ of about 45 degrees from the upper direction S of the display of the display portion 2 with respect to the display surface 2a of the display portion 2 in the aforementioned embodiment, the present invention is not restricted to this but the GPS antenna may be formed to be set to be at an angle $\theta$ other than about 45 degrees. The prescribed angle of the GPS antenna may be set in the range of at least 30 degrees and not more than 60 degrees and the directivity of the GPS antenna may be directed in the zenith direction in a state inclined by the angle φ when the user uses the mobile terminal while watching the display portion.

While the display portion 2 having the rectangular shape in plan view is rotatably mounted on the terminal body portion 1 in the aforementioned embodiment, the present invention is not restricted to this but the display portion may not be formed in the rectangular shape in plan view and may be formed to have a circle, an ellipse and a square other than the rectangular shape.

While the display portion 2 is rotatable in the range of about 90 degrees leftward and rightward (respective directions α and β in FIG. 1) on the shaft portion 3 serving as the rotation center respectively in the state where the display portion 2 is substantially parallel to the surface of the terminal body portion 1 in the aforementioned embodiment, the present invention is not restricted to this but the display portion may not be formed to be rotatable by 90 degrees leftward and rightward respectively. The display portion may be formed to be rotatable in the range of an angle other than 90 degrees and may be formed to be rotatable by 360 degrees, for example, so far as the mobile terminal can be formed to be switchable between the vertical manner and the horizontal manner by allowing rotation of the display portion by at least 90 degrees. The display portion may be formed to be rotatable either leftward (direction α in FIG. 1) or rightward (direction β in FIG. 1).

While the display portion 2 is coupled with the shaft portion 3 on the central position in plan view, and is rotatable on the shaft portion 3 serving as the rotation center in the state of being substantially parallel to the surface of the terminal body portion 1 in the aforementioned embodiment, the present invention is not restricted to this but the display portion may not be formed to be rotatable at the central position in plan view. The display portion may be formed rotatable on a position such as a corner other than the central position of the display portion in plan view.

While the GPS antenna 22 is provided on the upper direction S side of the display of the display portion 2 in the frame 21 in the aforementioned embodiment, the present invention is not restricted to this but the GPS antenna may be provided on a position other than the side of the upper direction of the display of the display portion. For example, the GPS antenna may be provided on a position on a lateral direction of the display of the display portion.

While the GPS antenna 22 is stored in the frame 21 of the display portion 2 in the aforementioned embodiment, the present invention is not restricted to this but the GPS antenna may be provided to be exposed on the surface of the frame, or may be arranged on the surface of the frame. The GPS antenna may not be provided in the frame of the display portion. The GPS antenna may be provided on the display portion to integrally rotate with the display portion.

While the mobile communication terminal 100 is usable in both of the vertical manner and the horizontal manner by rotating the display portion 2 in the aforementioned embodiment, the present invention is not restricted to this but the mobile terminal may be formed to be used in a manner other than the vertical manner and the horizontal manner.

While the display portion 2 is formed as to be located in the outline of the terminal body portion 1 in plan view in both of the vertical manner and the horizontal manner in the aforementioned embodiment, the present invention is not restricted to this but the display portion may be formed to protrude from the outline of the terminal body portion outward.

While the GPS antenna 22 is formed to have unidirectionality in the upper direction (direction R) with respect to the antenna surface 22a and a circularly polarized wave characteristic in the aforementioned embodiment, the present invention is not restricted to this but the GPS antenna may be formed to have a linearly-polarized wave characteristic other than the circularly polarized wave characteristic.

What is claimed is:

1. A mobile terminal comprising:
a terminal body portion;
a display portion mounted on said terminal body portion to be rotatable to a first display position and a second display position while being substantially parallel to a surface of said terminal body portion; and
a single satellite radio receiving antenna having unidirectionality, provided on said display portion to integrally rotate with said display portion, and formed to be located on a first rotational position when said display portion is located on said first display position and to be located on a second rotational position different from said first rotational position when said display portion is located on said second display position, wherein
a direction of directivity of said single satellite radio receiving antenna is set to a direction inclined with respect to a display surface of said display portion by a prescribed angle, such that the direction of the directivity of said satellite radio receiving antenna is directed to a zenith direction in both of a case where said satellite radio receiving antenna is located on said first rotational position and a case where said satellite radio receiving antenna is located on said second rotational position when said terminal body portion and said display surface of said display portion is held by a user so as to be inclined obliquely with respect to a horizontal plane in a state where an upper direction of display of said display portion is an upper direction of said terminal body portion in use of said terminal body portion.

2. The mobile terminal according to claim 1, wherein
said prescribed angle of said satellite radio receiving antenna with respect to said display surface of said display portion is an angle of at least 30 degrees and not more than 60 degrees.

3. The mobile terminal according to claim 2, wherein
said prescribed angle is substantially 45 degrees.

4. The mobile terminal according to claim 1, wherein
said display portion is provided rotatably by at least 90 degrees, and
said satellite radio receiving antenna provided on said display portion is arranged at a position on a side of the upper direction of the display of said display portion.

5. The mobile terminal according to claim 4, wherein
said satellite radio receiving antenna is arranged in the vicinity of a central portion of the display of said display portion in a horizontal direction.

6. The mobile terminal according to claim 1, wherein
said display portion includes a display screen portion and a frame body arranged to enclose said display screen portion, and
said satellite radio receiving antenna is provided on said frame body of said display portion separated by a prescribed distance from a rotation center of said display portion with respect to said terminal body portion.

7. The mobile terminal according to claim 6, wherein
said satellite radio receiving antenna is arranged on a position in the vicinity of an end surface of said frame body on a side of the upper direction of the display of said display portion.

8. The mobile terminal according to claim 7, wherein
said satellite radio receiving antenna is arranged in said frame body of said display portion.

9. The mobile terminal according to claim 8, wherein
said satellite radio receiving antenna is so fixedly arranged in said frame body of said display portion that the direction of the directivity is inclined with respect to said display surface of said display portion by said prescribed angle.

10. The mobile terminal according to claim 1, wherein
a display direction of an image displayed on said display portion is fixedly located with respect to said display portion, and the display direction of the image displayed on said display portion is rotated with respect to said terminal body portion by the rotational amount of said display portion when said display portion is rotated between said first display position and said second display position, and
the direction of the directivity of said satellite radio receiving antenna with respect to the display direction of the image displayed on said display portion is not changed also when said display portion is rotated to said first display position and said second display position with respect to said terminal body portion.

11. The mobile terminal according to claim 1, wherein
said terminal body portion has a rectangular shape in plan view, and is so formed that a vertical direction of the display of said display portion is a longitudinal direction of said terminal body portion when said display portion is located on said first display position and said satellite radio receiving antenna is located on said first rotational position while the vertical direction of the display of said display portion is a short-side direction of said terminal body portion when said display portion is located on said second display position and said satellite radio receiving antenna is located on said second rotational position.

12. The mobile terminal according to claim 11, wherein
said satellite radio receiving antenna provided on said display portion is arranged on a position on a side of the upper direction of the display of said display portion, and said satellite radio receiving antenna is arranged on a position in the vicinity of an outline of said rectangular terminal body portion in plan view when said satellite radio receiving antenna is located on said second rotational position with respect to said terminal body portion.

13. The mobile terminal according to claim 11, wherein
said display portion is provided to partially overlap with an upper surface of said rectangular terminal body portion in plan view, and said satellite radio receiving antenna is located inside the outline of said rectangular terminal body portion in plan view when said display portion is so rotated to said first display position or said second display position that said satellite radio receiving antenna is located on said first rotational position or said second rotational position with respect to said terminal body portion.

14. The mobile terminal according to claim 13, wherein
said satellite radio receiving antenna provided on said display portion is provided to be located inside the outline of said rectangular terminal body portion in plan view in both of a case where said satellite radio receiving antenna is located on said first rotational position with respect to said terminal body portion and a case where said satellite radio receiving antenna is located on said second rotational position with respect to said terminal body portion.

15. The mobile terminal according to claim 14, wherein
said display portion has a rectangular shape in plan view, and a long side of said display portion is arranged inside beyond the outline of said rectangular terminal body portion in plan view when said display portion is rotated to said second display position with respect to said terminal body portion, and
said satellite radio receiving antenna is arranged inside of said terminal body portion beyond the long side of said display portion in plan view when said satellite radio receiving antenna is arranged on said second rotational position by rotating said display portion to said second display position.

16. The mobile terminal according to claim 1, wherein
said terminal body portion includes an upper surface portion and a recess portion provided on a part of said upper surface portion,
said display portion is mounted on said recess portion of said terminal body portion, and
said satellite radio receiving antenna is arranged on a height position between said upper surface portion of said terminal body portion and a bottom surface of said recess portion.

17. The mobile terminal according to claim 1, wherein
a speaker is provided on a first end of said terminal body portion in a longitudinal direction, and
said satellite radio receiving antenna is arranged on a position on a side of said speaker beyond a central position of said terminal body portion in the longitudinal direction when said display portion is so rotated to said first display position or said second display position that said satellite radio receiving antenna is located on said first rotational position or said second rotational position with respect to said terminal body portion.

18. The mobile terminal according to claim 17, further comprising an operating portion having a plurality of operation keys, wherein
said satellite radio receiving antenna is arranged on a position between said operating portion and said speaker in both of a case where said satellite radio receiving antenna is located on said first rotational position with respect to said terminal body portion and a case where said satellite radio receiving antenna is located on said second rotational position with respect to said terminal body portion.

19. The mobile terminal according to claim 1, further comprising a communication antenna performing radiotelephone communication, wherein
said satellite radio receiving antenna is provided on said display portion to be movable to at least said first rotational position and said second rotational position, and
said communication antenna is provided on said terminal body portion.

20. The mobile terminal according to claim 1, wherein
said satellite radio receiving antenna has a circularly polarized wave characteristic and is an antenna capable of receiving satellite radio wave including positional information of a global positioning system.

* * * * *